United States Patent
Prasad et al.

(10) Patent No.: US 11,893,058 B2
(45) Date of Patent: Feb. 6, 2024

(54) MANAGEMENT OF TASKS

(71) Applicant: Palantir Technologies Inc., Denver, CO (US)

(72) Inventors: Anshuman Prasad, New York, NY (US); Hasan Dincel, London (GB); James Neale, Norwich (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/109,157

(22) Filed: Feb. 13, 2023

(65) Prior Publication Data

US 2023/0195791 A1 Jun. 22, 2023

Related U.S. Application Data

(63) Continuation of application No. 17/012,360, filed on Sep. 4, 2020, now Pat. No. 11,580,160.

(30) Foreign Application Priority Data

Sep. 4, 2019 (GB) ..................... 1912716

(51) Int. Cl.
*G06F 16/84* (2019.01)
*G06F 16/242* (2019.01)
(Continued)

(52) U.S. Cl.
CPC ............ *G06F 16/86* (2019.01); *G06F 9/5038* (2013.01); *G06F 16/248* (2019.01); *G06F 16/2448* (2019.01); *G06F 21/6227* (2013.01)

(58) Field of Classification Search
CPC ........... G06F 16/2448; G06F 16/24575; G06F 16/248; G06F 16/86; G06F 9/5038; G06F 21/6227; G06Q 10/063–063118
See application file for complete search history.

(56) References Cited

U.S. PATENT DOCUMENTS 9,171,263 B2  10/2015  Flinn et al.
9,760,606 B1   9/2017  Wilczynski et al.
(Continued)

FOREIGN PATENT DOCUMENTS

EP   3321825 A1   5/2018
EP   3477420 A1   5/2019

OTHER PUBLICATIONS

Extended European Search Report dated Mar. 12, 2021, issued in related European Patent Application 20194543.3 (9 pages).
(Continued)

*Primary Examiner* — Robert W Beausoliel, Jr.
*Assistant Examiner* — Nirav K Khakhar
(74) *Attorney, Agent, or Firm* — Sheppard Mullin Richter & Hampton LLP

(57) ABSTRACT

A method, computer program and apparatus is disclosed. The method, performed by one or more processors, may comprise receiving, from one or more predetermined organizations, datasets representing entities and datasets representing one or more tasks for those entities and storing in a database, in accordance with an ontology which is common to the organizations, the received one or more datasets as data objects, the ontology defining properties of data objects and relationships between the data objects. The method may also comprise mapping the data objects stored in the database to the organization from which the one or more datasets were received and receiving, through a querying application, a query from a user of one of the predetermined organizations to view one or more data objects relating to a task. The method may also comprise identifying the organization to which the user is associated, generating, based on the mapping, a view including at least the one or more task data objects associated with the identified organization and not (Continued)

data objects associated with other organizations and displaying the view on a user interface.

20 Claims, 7 Drawing Sheets

(51) Int. Cl.
*G06F 16/248* (2019.01)
*G06F 9/50* (2006.01)
*G06F 21/62* (2013.01)

(56) References Cited

U.S. PATENT DOCUMENTS

| | | |
|---|---|---|
| 9,798,787 B1 | 10/2017 | Beard et al. |
| 10,489,462 B1 | 11/2019 | Rogynskyy et al. |
| 10,909,130 B1 | 2/2021 | Scott et al. |
| 2005/0108001 A1 | 5/2005 | Aarskog |
| 2013/0226879 A1 | 8/2013 | Talukder et al. |
| 2016/0344772 A1 | 11/2016 | Monahan et al. |
| 2017/0337287 A1 | 11/2017 | Gill |
| 2018/0276593 A1 | 9/2018 | Perret et al. |
| 2019/0034491 A1 | 1/2019 | Griffith et al. |
| 2019/0042988 A1 | 2/2019 | Brown et al. |

OTHER PUBLICATIONS

A. B. Marques, J. R. Carvalho, R. Rodrigues, T. Conte, R. Prikladnicki and S. Marczak, "An Ontology for Task Allocation to Teams in Distributed Software Development," 2013 IEEE 8th International Conference on Global Software Engineering, 2013, pp. 21-30, doi: 10.1109/ICGSE.2013.12. (Year: 2013).

MANAGEMENT OF TASKS

CROSS-REFERENCE TO RELATED APPLICATION

This application is a continuation of U.S. application Ser. No. 17/012,360, filed Sep. 4, 2020, which claims priority to UK Application Number GB1912716.6 filed Sep. 4, 2019, the content of which is incorporated herein by reference in its entirety.

TECHNICAL FIELD

The present disclosure relates to systems and methods for management of tasks, for example in relation to management task for mobile entities such as portable electronics equipment, or vehicles or craft. Some embodiments may relate to sending data for actioning such tasks.

BACKGROUND

Cloud computing is a computing infrastructure for enabling ubiquitous access to shared pools of servers, storage, computer networks, applications and other data resources, which can be rapidly provisioned, often over a network, such as the Internet.

For example, a "data resource" as used herein may include any item of data or code (e.g., a data object representing an entity) that can be used by one or more computer programs. In example embodiments, data resources may be stored in one or more network databases and are capable of being accessed by applications hosted by servers that share common access to the network database. A data resource may, for example, be a data analysis application, a data transformation application, a report generating application, a machine learning process, a spreadsheet or a database, or part of a spreadsheet or part of a database, e.g. records or data objects.

Some companies provide cloud computing services for registered organizations, for example, organizations such as service providers, to create, store, manage and execute their own resources via a network. Users within the organization's domain, and other users outside of the customer's domain, e.g., support administrators of the provider company, may perform one or more actions on one or more data resources, which database actions may vary from reading, authoring, editing, transforming, merging, or executing. Sometimes, these resources may interact with other resources, for example, those provided by the cloud platform provider. Certain data resources may be used to control external systems.

Certain data resources, such as applications for managing maintenance tasks, are generally created and customized by individual organizations that need to monitor and manage such tasks. Typically, the data resource may comprise one or more spreadsheet applications for users to manually create a spreadsheet, populate the spreadsheet with data, cross reference different spreadsheets and update over time. Such applications may not take account of other organizations' maintenance tasks that may require the same infrastructure, e.g. engineering resources, and may overlap in terms of timing, requiring repeated updating of the spreadsheets and delays in performing maintenance.

SUMMARY

According to one aspect, there is provided a method, performed by one or more processors, comprising: receiving, from one or more predetermined organizations, datasets representing entities and datasets representing one or more tasks for those entities; storing in a database, in accordance with an ontology which is common to the organizations, the received one or more datasets as data objects, the ontology defining properties of data objects and relationships between the data objects; mapping the data objects stored in the database to the organization from which the one or more datasets were received; receiving, through a querying application, a query from a user of one of the predetermined organizations to view one or more data objects relating to a task; identifying the organization to which the user is associated; generating, based on the mapping, a view including at least the one or more task data objects associated with the identified organization and not data objects associated with other organizations; and displaying the view on a user interface.

The querying application may be common to the plurality of organizations.

The querying application may be a web-based application.

The stored data objects may include one or more identifiers unique to the organization from which the one or more datasets were received and wherein the mapping between the organizations and their one or more unique identifiers may be provided in a configuration file.

The querying application may identify the organization to which the user is associated by means of accessing an external permissioning system, which external permissioning system stores a mapping between a user identifier associated with the user query and the organization to which the user belongs.

The querying application may further identify, from the external permissioning system, database actions that the identified user is permitted to perform on data objects in the generated view, the querying application further enforcing said actions.

The received data sets may represent data objects including: one or more mobile entities; for each mobile entity: one or more tasks; and one or more future locations of the mobile entity at respective times, and the method may further comprise, for a particular mobile entity, performing a planning algorithm to allocate the one or more future tasks to a work package to be performed at a future location and time, the allocating being based at least on the future locations and times of the mobile entity and a determined future availability at those locations and times, the generated view of the one or more stored data objects including an indication of the allocated work package and not allocations of work packages for other organizations.

A plurality of available predetermined work packages may be predefined as belonging to a particular maintenance resource at a particular location, and wherein allocation of one or more future tasks for a mobile entity to a said work package may prevent said work package being made available to other organizations.

The allocating may comprise applying one or more predefined allocation strategies based at least on an estimated time to perform the one or more future tasks.

The one or more predefined allocation strategies may be associated with a particular organization, said one or more allocation strategies only being applied to data objects for that particular organization.

The generated view may comprise an indication of one or more allocated work packages for that particular organization relative to a timeline.

The one or more allocated work packages may be user-modifiable through the user interface to an alternative location and/or time available to that particular organization.

The method may further comprise sending data for performing the one or more allocated tasks to a computerized resource associated with the location and at, or prior to, the allocated time.

According to another aspect, there may be provided a computer program, optionally stored on a non-transitory computer readable medium, which, when executed by one or more processors of a data processing apparatus cause the data processing apparatus to carry out a method according to any preceding definition.

According to another aspect, there may be provided an apparatus configured to carry out a method according to any preceding claim, the apparatus comprising one or more processors.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Figure 1:
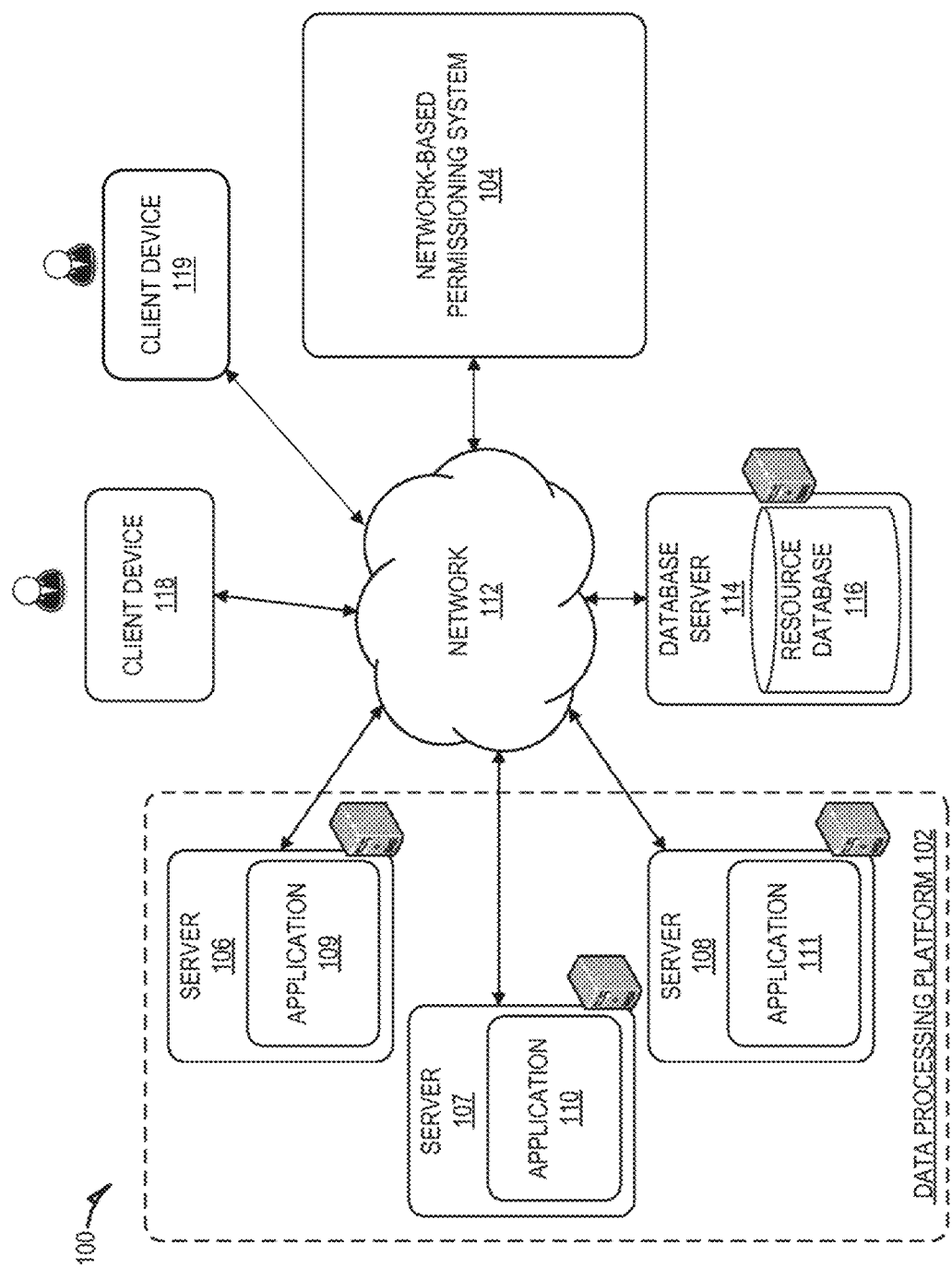
FIG. 1 is a block diagram illustrating a network system comprising a group of application servers of a data processing platform according to some embodiments of this specification.

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments generally relate to databases, for example databases for storing data objects which may represent any form of data. For example, data objects may represent real-world objects or "entities" such as machines, computers, software modules, vehicles or craft (e.g. ships or aircraft), components thereof and/or situational or engineering data associated with such real-world objects. For example, one type of data object may represent entities requiring some form of maintenance and another type of data object may represent one or more maintenance tasks, which may be scheduled or unscheduled maintenance tasks.

In embodiments herein, scheduled maintenance tasks will be described. Embodiments are applicable however to other types of task.

A maintenance task is any repair or upkeep task of an engineering nature, including software as well as hardware and/or mechanical. A scheduled maintenance task is one performed within a set timeframe, usually defined by a manufacturer based on testing, experimentation, machine modelling or any combination thereof. Scheduled maintenance tasks may occur at repeating intervals, or in response to a request.

The database may be a shared database; that is a database that stores data objects for use by multiple organizations, with restrictions being employed to determine how particular organizations can access and view their own data objects and not those of others. Use of a shared database provided in the cloud means that the organizations need not provide the necessary storage devices and/or a database management system (DMS) for handling aspects such as query handling, transactions, aggregation and so on.

An organization may be an entity having a distinct individual identifier to a computer system or computer network, be it an organization or company, a user or group of users of that organization or company, or an automated user such as a machine or sensor that generates data based on sensed or measured input. An organization may be identified by means of a computer-readable identifier, e.g. an organizational identifier, and users may individually be identified by a user identifier (user ID). Either form of identifier may be associated with a password or some other verification means to identify the party to an Access Control System (ACS) to gain access to data objects and/or applications that permissions stored or accessed by the ACS permits. A user of an organization may also be a computer, such as a client terminal or a server, so long as it can identify and verify itself to the ACS.

The database may be part of a distributed set of database modules, interconnected by a network, wherein some parties use one database module and other parties use a different database module. For example, the database may comprise one or more physical storage nodes and the ingesting and output of data the database, and functionality such as indexing, load balancing and transaction handling may be managed by a common DMS. The DMS may be a relational database management system or a graph-based database management system. A single DMS may be associated with multiple different database nodes, but may treat them as a single database.

Example embodiments may involve the creation, provision and/or use of a common ontology for enforcing consistency on data objects in a database, notwithstanding that datasets corresponding to data objects may derive from different organizations and/or different machines. In this context, multiple organizations may store datasets relating to their operations. Such datasets may be confidential and sometimes such datasets may be shared with one or more other parties in the course of working on a common or related project. How to organize and manage one or more such datasets, or transformed versions of the one or more such datasets should be done in a consistent and error-free way to avoid downstream errors based on the datasets and/or locking up computer systems which are configured to operate on such datasets. For example, an organization such as a shipping company or airline may need to store datasets corresponding to a particular craft, route, logbook data, and engineering data, such as component performance and/or failure data. The organization may store in a database datasets representing one or more data objects, as may other organizations operating in the same or similar operational sector. Sometimes those suppliers and customers may also work with other organizations where maintenance tasks are to be performed, e.g. at ports or maintenance depots, and those organizations may wish to store data objects corresponding to particular berths or docking stations, including their future temporal availability, what facilities they have and the manpower that is available at said future times.

Thus, providing a shared database and common ontology also obviates the need for the individual organizations to provide their own silos of data and also enables use of common applications or other data resources to operate on the stored data in a predictable and consistent way, avoiding downstream errors and system crashes.

As used herein, an ontology is a machine interpretable model defining in a formalized way one or more data objects as defined herein. For each data object, the ontology may define an object type and one or more object properties. It may also define relationships between data objects.

A data object is a data structure for storing data relating to an entity, which can be any entity such as a person, organization, vehicle, craft, physical object or event, to give some examples. A data object may be defined in a table, e.g. as a row in a table, and, in some cases, one or more keys may be provided in a row to link to one or more other tables to define a particular data object.

A dataset is a set of data which may relate to a data object or a plurality of data objects, but which may or may not conform to the required format or structure of the one or more data objects defined in the ontology. Datasets may be generated by humans and/or by machines and/or sensors, such as by one or more computers or measurement equipment. Datasets may comprise also tables of data comprising rows and columns, but may be provided in any suitable form. Data items in a dataset may comprise values corresponding to the rows and columns or keys to other datasets.

By way of example, in the context of transportation, a data object may be of a "ship" type and may have properties such as one or more of "date of entering service", "owner", "operator", "engines", "routes" and so on. A value may be provided for each property and stored as a data item. Some values may be null values, i.e. there is no data item, because that data may not be available in data form. One or more relationships may also be defined, such how the ship object relates to other objects. For example, the value of the operator may have a relationship to another data object defining the operator, i.e. a company having properties such as a locations, engineering capabilities, contact details and number of employees. The relationship may be "operated by".

Definitions of properties and relationships may comprise metadata within the ontology and/or associated with one or more fields which may be provided by columns in a table. In some embodiments, the ontology is defined using a schema, which may use a schema data definition language (DDL) such as XML or equivalent.

The ontology may be one that defines, for example using a DDL, a restricted set of data objects for which ingested data should conform to, as a requirement to be stored to the shared database and/or propagated to one or more downstream transforms and/or to other ontologies.

Embodiments herein may provide an ontology for a predefined or preregistered set of transportation provider organizations. The ontology may be transmitted to the organizations so that they can configure their systems to provide datasets which may be stored in a consistent way in a database that is used by a maintenance planning algorithm to allocate one or more future maintenance tasks to a work package to be performed at a future location and time.

A work package is an organizational unit which can hold one or more maintenance tasks. A work package can be considered a data object having properties and a duration.

Embodiment herein may involve receiving, from one or more predetermined organizations, datasets representing entities and datasets representing one or more maintenance tasks for those entities and storing in a database, in accordance with an ontology which is common to the organizations, the received one or more datasets as data objects, the ontology defining properties of data objects and relationships between the data objects. Embodiments may also involve mapping the data objects stored in the database to the organization from which the one or more datasets were received and receiving, through a querying application, a query from a user of one of the predetermined organizations to view one or more data objects relating to a maintenance task. Embodiments may involve identifying the organization to which the user is associated and generating, based on the mapping, a view including at least the one or more maintenance task data objects associated with the identified organization and not data objects associated with other organizations. The view may be displayed on a user interface. In this way, a shared database may be used for storing maintenance task data objects for any number of organizations, which data objects are ingestible to, for example, a common application having the task of allocating the represented maintenance tasks to work packages defining when and where those tasks are to be performed. Because the data objects for the different organizations are stored in a consistent and known format, downstream transformations, such as those that may be performed by the common application, can ensure that tasks are allocated to work packages in a consistent and error-free way taking account of what has already been allocated to other organizations. For example, this may be to ensure that the same work package is not allocated to different entities and/or for different organizations. At the same time, it is preferred to ensure that a given organization cannot see data objects for other organizations even though such different data objects are taken into account as part of the allocation operations.

In some embodiments, the querying application may be common to the plurality of organizations. The querying application may be a web-based application.

The stored data objects may include one or more identifiers unique to the organization from which the one or more datasets were received and wherein the mapping between the organizations and their one or more unique identifiers may be provided in a configuration file. The configuration file may be edited as and when required to reflect changes. The configuration file may be common to all organizations. The querying application may identify the organization to which the user is associated by means of accessing an external permissioning system, which external permissioning system stores a mapping between a user identifier associated with the user query and the organization to which the user belongs. The querying application may further identify, from the external permissioning system, database actions that the identified user is permitted to perform on data objects in the generated view, the querying application further enforcing said actions.

The received data sets may represent data objects including: one or more mobile entities; and for each mobile entity: one or more maintenance tasks; and one or more future locations of the mobile entity at respective times.

Example embodiments may further comprise, for a particular mobile entity, performing a maintenance planning algorithm to allocate the one or more future maintenance tasks to a work package to be performed at a future location and time, the allocating being based at least on the future locations and times of the mobile entity and a determined future availability at those locations and times, the generated view of the one or more stored data objects including an indication of the allocated work package and not allocations of work packages for other organizations.

A plurality of available predetermined work packages may be predefined as belonging to a particular maintenance resource at a particular location, and wherein allocation of one or more future maintenance tasks for a mobile entity to a said work package prevents said work package being made available to other organizations. The allocating may comprises applying one or more predefined allocation strategies based at least on an estimated time to perform the one or more future maintenance tasks. The one or more predefined allocation strategies may be associated with a particular organization, said one or more allocation strategies only being applied to data objects for that particular organization.

The following description provides an example of how example embodiments may be employed in an example network system.

FIG. 1 is a network diagram depicting a network system 100 comprising a data processing platform 102 in communication with a network-based permissioning system 104 (for example, a form of Access Control System or ACS) configured for evaluating access permissions for data resources to which the group of application servers 106-108 share common access according to some embodiments. Client devices 118, 119 are also shown connected to the network 112 and may be associated with one or more users or groups of users, i.e. different parties. In certain embodiments, the network system 100 may employ a client-server architecture, though is not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed. As part of the network-based permissioning system 104, identifiers associated with particular individual users may also be associated with identifiers associated with their respective organization, e.g. user X belongs to organization A or machine Y belongs to organization B.

In certain examples, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyze data to develop various insights about the data, and visualize various metrics associated with the data. To further this example, the network application 109 may be used to analyze data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers, and in certain embodiments, fewer or additional servers and applications may be included.

According to some examples, each of the servers 106-108 are in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

In some examples, within an established login or access session, to access data resources from the resource database 116, the servers 106-108 transmit access requests via the network 112 to the network-based permissioning system 104. For example, an access request includes a data resource identifier and a user identifier corresponding to a user (also referred to herein as, e.g., a "requesting user") who may be utilizing one of the applications 109-111 to access to the data resource (also referred to herein as, e.g., a "requesting application"). As an example, the network-based permissioning system 104 may include an application programming interface (API) or other machine interface to receive such access requests from the server 106-108 hosting the requesting application 109-111.

In certain examples, upon receiving an access request for a particular data resource, the network-based permissioning system 104 accesses a separately stored policy object associated with the particular data resource. Policy objects are stored in a database of the network-based permissioning system 104, which is maintained independently of the resource database 116.

According to some examples, a policy object includes a data structure that includes an identifier (e.g., a globally unique resource identifier) of the data resource to which it is associated, one or more identifiers of a parent data resource from which the data resource depends (referred to as a "parent identifier"), and/or policy information that includes dependent resource identifiers. The policy information may also include one or more statements that specify operations the user is or is not authorized to perform with respect to the data resource based on satisfaction of one or more conditions. Authorized operations may be globally applicable to the network system 100, or may be specific to any one of the network applications 109-111.

According to certain examples, the network-based permissioning system 104 uses the policy information in the corresponding policy object to determine the user's access permissions with respect to the data resource. Once the network-based permissioning system 104 determines the user's access permission with respect to the data resource, the network-based permissioning system 104 communicates a response to the access request to the requesting application. More specifically, the network-based permissioning system 104 communicates one or more data packets (e.g., computer-readable information) to the server hosting the requesting application as a response to the access request. The response to the access request may include the identified requesting user's access permissions with respect to the data resource. The requesting user's access permissions may include one or more authorized operations that the user may perform on the data resource.

According to some examples, the network-based permissioning system 104 serves as a centralized permissioning system for the data processing platform 102 to evaluate access permissions of users of the network system 100 with respect to data resource stored in the resource database 116. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

In some examples, as shown, the network system 100 also includes one or more client devices 118, 119 in communication with the data processing platform 102 and the network-based permissioning system 104 over the network 106. The client devices 118, 119 communicate and exchange data with the data processing platform 102.

In certain examples, the client devices 118, 119 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client devices 118, 119 and the data processing platform 102 involve user-selected functions available through one or more user interfaces (UIs). The UIs may be specifically associated with a web client (e.g., a browser) or an application 109-111 executing on the client devices 118, 119 that is in communication with the data processing platform 102. For example, the network-based permissioning system 104 provides user interfaces to respective users or parties associated with the client device 118, 119 (e.g., by communicating a set of computer-readable instructions to the client devices 118, 119 that cause the respective client device to display the user interfaces) that allow the user to register policies associated with data resources stored in the resource database 116.

Figure 2:
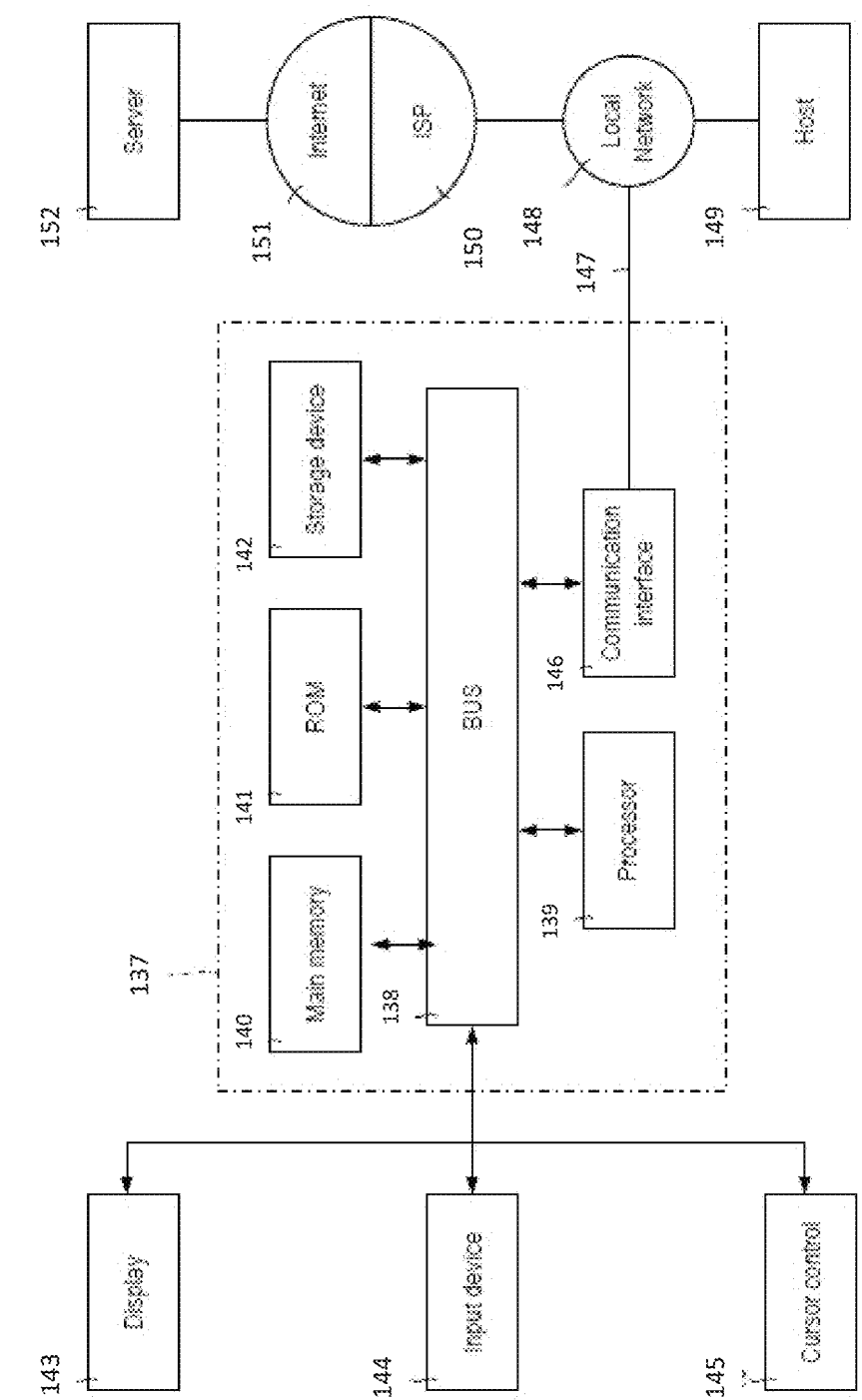
FIG. 2 is a block diagram of a computer system according to embodiments of this specification.

FIG. 2 is a block diagram of a computer system 137 according to certain embodiments, which may comprise the data processing platform 102, one or more of the servers 106-108, the database server 114, and/or the network-based permissioning system 104.

According to certain examples, the computer system 137 includes a bus 138 or other communication mechanism for communicating information, and a hardware processor 139 coupled with the bus 138 for processing information. The hardware processor 139 can be, for example, a general purpose microprocessor. The hardware processor 139 comprises electrical circuitry.

In some examples, the computer system 137 includes a main memory 140, such as a random access memory (RAM) or other dynamic storage device, which is coupled to the bus 138 for storing information and instructions to be executed by the processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

In certain examples, the computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

According to some examples, the computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is a cursor control 145, for example, using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

According to certain examples, the computer system 137 can implement the techniques described herein using customized hard-wired logic, one or more ASICs or FPGAs, firmware and/or program logic which in combination with the computer system causes or programs the computer system 137 to be a special-purpose machine.

According to some embodiments, the operations, functionalities, and techniques disclosed herein are performed by the computer system 137 in response to the processor 139 executing one or more sequences of one or more instructions contained in the main memory 140. Such instructions can be read into the main memory 40 from another storage medium, such as the storage device 142. Execution of the sequences of instructions contained in the main memory 140 causes the processor 139 to perform the process steps described herein. In certain embodiments, hard-wired circuitry can be used in place of or in combination with software instructions.

For example, the term "storage media" as used herein refers to any non-transitory media that stores data and/or instructions that cause a machine to operate in a specific fashion. In some examples, such storage media can comprise non-volatile media and/or volatile media. Non-volatile media includes, for example, optical or magnetic disks, such as storage device 142. In an example, volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

In some examples, storage media is distinct from, but can be used in conjunction with, transmission media. Transmission media participates in transferring information between storage media. For example, transmission media includes coaxial cables, copper wire and fibre optics, including the wires that comprise the bus 138. Transmission media can also take the form of acoustic or light waves, such as those generated during radio-wave and infra-red data communications.

In certain examples, various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to the computer system 137 can receive the data on the telephone line or other transmission medium and use an infra-red transmitter to convert the data to an infra-red signal. An infra-red detector can receive the data carried in the infra-red signal and appropriate circuitry can place the data on the bus 138. The bus 138 carries the data to the main memory 140, from which the processor 139 retrieves and executes the instructions. The instructions received by the main memory 140 can optionally be stored on the storage device 142 either before or after execution by the processor 139.

According to some examples, the computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

According to certain examples, the network link 147 provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network commonly referred to, e.g., as the "Internet" 151. The local network 148 and the Internet 151 both use electrical, electromagnetic or optical signals that carry digital data streams. The signals through the various networks and the signals on the network link 147 and through the communication interface 146, which carry the digital data to and from the computer system 137, are example forms of transmission media.

In some examples, the computer system 137 can send messages and receive data, including program code, through the network(s), network link 147 and communication interface 146. For example, a first application server 106 may transmit data through the local network 148 to a different application server 107, 108.

Figure 3:
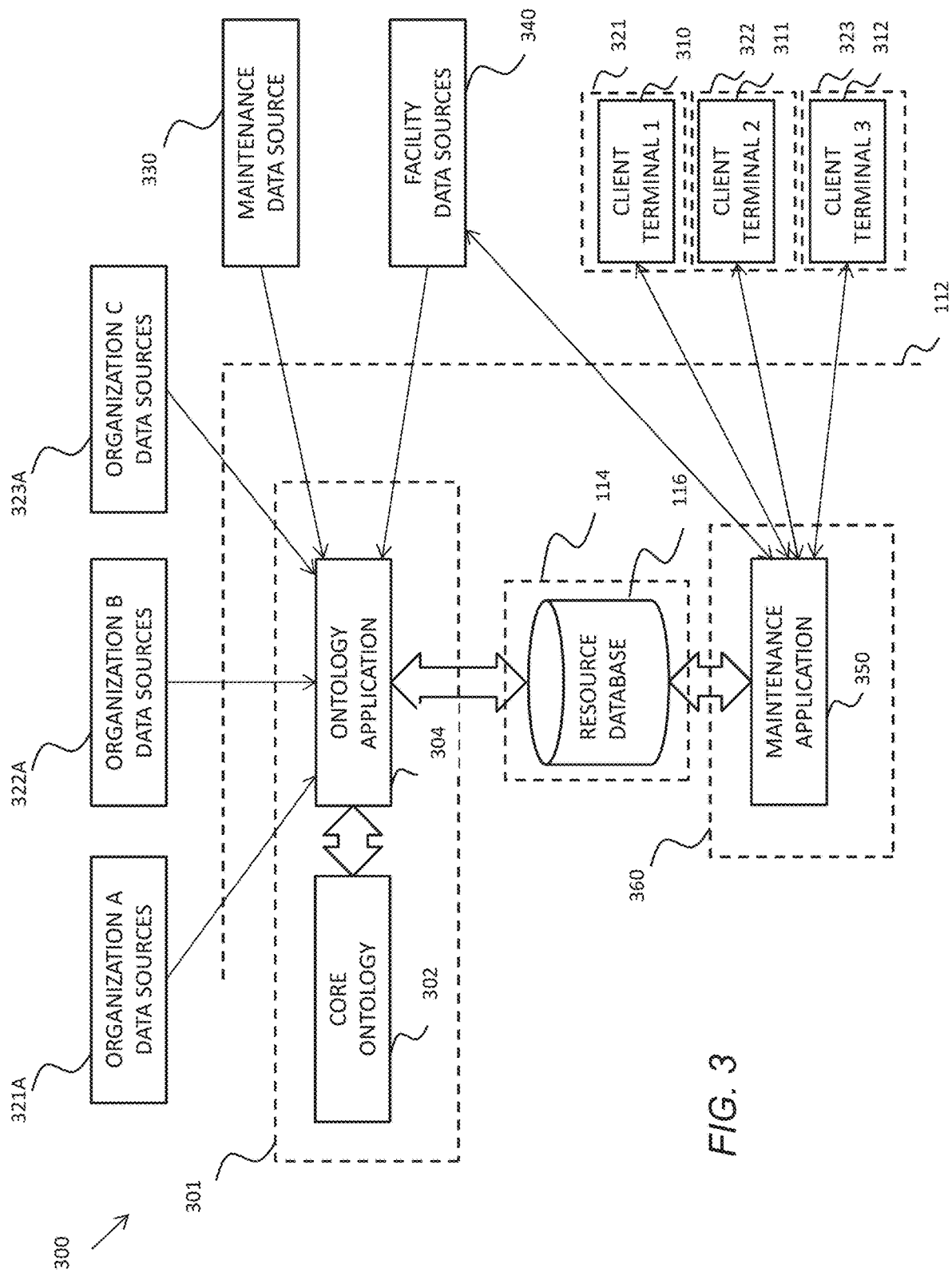
FIG. 3 is a schematic diagram of a network system, that may be part of the FIG. 1 network system, including an ontology system and maintenance application according to embodiments of this specification.

FIG. 3 is a block diagram of a computer network 300 that may be based on the FIG. 1 network according to certain embodiments. The computer network may, for example, comprise the network 112, database server 114 and resource database 116 as shown in FIG. 1. The computer network 300 may also comprise one or more computer processing nodes of the FIG. 1 computer network, which may comprise the data processing platform 102, one or more of the servers 106-108, the database server 114, and/or the network-based permissioning system 104. For example, one or more of the servers 106-108 may comprise an ontology system 301 which is a centralised server for maintaining a core ontology 302 and an ontology application 304 which is associated with the core ontology. Alternatively, the database server 114 may provide, as additional functionality, the functions of the ontology system 301. The ontology system 301 may provide the core ontology 302 and the ontology application 304 in a single file, which may be a template file. Alternatively, separate files respectively comprising the core ontology 302 and the ontology application 304 may be provided. The core ontology 302 and the ontology application 304 may be deployed to a plurality of client terminals 310-312 each of which may be permitted access to the resource database 116 on the database server 114 in accordance with permissions stored in the network-based permissioning system 104.

Each client terminal 310-312 (hereafter "terminals") may be configured according to FIG. 2. Each terminal 310-312 may be one of a computer, laptop, tablet computer, and mobile telephone, to give some examples.

Each terminal 310-312 may be associated with a particular organization. For example, the first terminal 310 may comprise part of a first organization "A" 321 having its own network of terminals. For example, a second terminal 311 may comprise part of a second organization "B" 322, different from the first organization 321, having its own network of terminals. For example, a third terminal 313 may be associated with a third organization "C" 323, different from the first and second organizations 321, 322, having its own network of terminals. The first to third organizations 321-323 may be different transportation operators, such as shipping companies, for example.

The core ontology 302 may comprise code composed using a schema DDL such as XML to define conformity constraints and possibly data health tests, i.e. forms of verification checks.

The core ontology 302 may maintain data objects based on datasets received from data sources 321A, 322A, 323A of each of the first to third organizations 321-323. Such data sources may be any form of data generating or storage module, such as a hard drive, database, machine, computer terminal or client application. For example, each organization 321-323 may need to store datasets corresponding to a particular craft, route, logbook data, and/or engineering data, such as component performance and/or failure data. Said datasets are provided, either manually or automatically, e.g. at some periodic interval, to the ontology application 304 which enforces the conformity constraints and the data health tests, if present.

In operation, when datasets are received from one of the data sources 321A, 322A, 323A, or possibly edited by one of the terminals 321, 322, 323, such requests must pass through the ontology application 304. The resource database 116, or at least the part of the resource database that is configured to store data objects for shared use between different organizations, may only commit data objects to the database if the datasets are first checked by the ontology application 304.

The ontology application 304 tests data according to the core ontology 302. The core ontology 302 provides a unifying ontology that acts as a source of truth that all organizations and their users or computers need to adhere to in terms of creating or editing datasets. In this sense, creating may also mean ingesting existing datasets. In one sense, enforcing the use of the core ontology 302 by means of the ontology application 304 establishes a form of communications protocol that all parties to the resource database 116 must adhere to.

The core ontology 302 may define a limited set of objects from which other objects can be derived from. For example, the ontology application 304 may enable parties to generate their own local derived ontology or ontologies, which take data objects which conform to the core ontology 302 and apply some other constraints or derive other relationships therefrom. For this reason, the ontology application 304 may be configured only to accept raw datasets and not datasets derived from other ontologies, although some pre-processing such as cleaning may be performed on the raw datasets initially. Derived ontologies may not sit inside the core ontology 302 but can be directly derived therefrom.

The conformity constraints of the core ontology 302 may define hard requirements. That is, they may comprise assertions that need to be met in order for a received dataset to be considered in conformance. For example, for a data object of type "ship" then properties of that ship object may comprise "ship identifier", "ship origin", "date of entering service", "owner", "operator", "engines" and "routes". For "ship identifier" the core ontology 302 may require values having a specific n-digit format. For "ship origin", the core ontology 302 may require a standardised two-character country code. For "date of entering service", the core ontology 302 may require values having the mm-dd-yyyy format. Other examples may be envisaged along the same or similar lines. The ontology application 304, upon receiving a dataset comprising a field corresponding to, for example, "date of entering service" in a format other than the mm-dd-yyyy format will fail the assertion and the dataset may not be propagated on to being stored in the resource database 116. As another example, consider engineering or technical data. For a data object of type "engine" then a property of that engine may comprise "maximum torque." For "maximum torque" the core ontology 302 may require values in units of Newton metres (Nm) and which should be four to six digits in length. Other examples may be envisaged along the same or similar lines. The ontology application 304, upon receiving a dataset comprising a field corresponding to, for example, "maximum torque" in different units or not being four, five or six digits in length (e.g. if the dataset reflected 25 kNm rather than 25000 Nm) then the received dataset will fail the assertion and the dataset may not be propagated on to being stored in the resource database 116.

In some embodiments, the ontology application 304 may however be configured to attempt to fix negative assertions prior to preventing propagation of the dataset. For example, taking the above example, one fix might to be automatically detect the presence of the "k" in the units and convert 25 to 25000 which then will meet the constraint imposed on that object property. Another example is by detecting, for the "ship origin" property, a data item of value "Britain". One might automatically identify this as corresponding to the standard two-character code of GB and fix it accordingly.

Failure of any assertion against the ontology constraints may produce an indication to be displayed at the terminal associated with the origin of the relevant dataset, e.g. the terminal itself or an administrator terminal associated therewith. This is at least to notify the provider of the dataset that action is needed to make the dataset conform and/or that the system or machine which is generating the datasets requires checking or maintenance. The indication may be by means of a graphical user interface (GUI) which may indicate the specific dataset in error, as well as why it is in error. If fixes have been performed automatically, these may be notified. If fixes are suggested, these may be indicated as suggested fixes in the GUI that require selection of an "ok" or similar function to proceed with the fix. Any additional information as may be useful to assist the user may also be presented on the GUI. For example, if a machine or computer is generating data in a non-compliant format, a prompt may be presented in the GUI that would enable all subsequently generated datasets to use a compliant format, and selection of an "ok" or similar function may automatically cause automatic conversion of the received datasets to the conforming format.

Data health tests are used for a different purpose and may be applied each time datasets are ingested, or periodically on datasets stored in the resource database 116 by the associated party or terminal. Data may considered healthy or unhealthy even if it conforms with the constraints imposed by the core ontology 302. For example, a received raw dataset may contain a number of nulls. For example, if no data item is generated or made available for "maximum torque" in a received dataset, this is considered a null. This may be considered a special case wherein the one or more constraints are not failed merely due to the data item being a null. The remainder of the dataset may still be propagated as one or more objects to the resource database 116, or to other transforms, assuming no other assertions are failed. As another example, a received raw dataset whereby the number of characters or digits varies by a predetermined number may be considered unhealthy, e.g. some values have four digits and some have six digits. Again, whilst this may meet restraints of the relevant field, it may be indicative of unusual activity. The dataset may still be propagated as one or more objects to the resource database 116, or to other transforms, assuming no other assertions are failed. Data health tests may similarly comprise assertion tests or some other quality-based metric. Indications as to the result of applying one or more data health tests 406 against received datasets may be provided by means of the graphical user interface (GUI). Similar to constraints, fixes may be attempted automatically or fixes may be suggested. If fixes are suggested, these may be indicated as suggested fixes in the GUI that require selection of an "ok" or similar function to proceed with the fix. Any additional information as may be useful to assist the user may also be presented on the GUI.

In some embodiments, one or more predetermined thresholds the one or more data health tests may determine, for a received dataset comprising rows and columns of data items, a number of data items in the rows and/or columns determined as unhealthy based on health check criteria in the core ontology, the indication of the erroneous data being based on the number of unhealthy data items in one or more rows and/or columns. For example, the GUI may indicate that M data items in an ingested row or column comprises N nulls or M data items that vary by more than a predetermined amount from the majority of other data items. In some embodiments, an indication of unhealthy data is based on the proportion of the number of unhealthy data items in the one or more rows and/or columns to the total number of data items in the corresponding row and/or column. This may be given as a percentage. For example, the indication may state that 32% of data items in a given row or column are nulls.

In some embodiments, the ontology application 304 may be configured to prevent creation and/or storage of at least some of the data objects or the received one or more datasets in the shared database if the number or the proportion of unhealthy data items in a row or column exceeds a predetermined threshold. For example, if it is determined that greater than X data items in a given row or column contain nulls, or greater than 20% of data items in a given row or column contain nulls, then further propagation of the dataset may be halted. This is to prevent unhealthy data indicative of a more general problem in the dataset, e.g. generated by a machine or industrial process, being propagated to downstream processes or other machines that are reliant on that data. The number or percentage may be user configured and/or may depend on the data items in question.

One or more other data sources may provide data to the ontology system 301, i.e. to the ontology application 304, to ensure that the received datasets can be stored as data objects in the resource database 116 in accordance with the core ontology 302.

For example, a maintenance data source 330 may provide datasets representing maintenance events that are required for a particular type of entity. The maintenance data source 330 may therefore provide, as reference, a maintenance schedule for respective types of entity. For example, a particular type of ship or other craft may be identified by a particular code, e.g. AB001 and the maintenance data source may store a table or other data structure defining one or more maintenance tasks that need to performed on this entity type and when the one or more tasks need to be performed. This "type" data may be a manufacturer code, model type or serial number. The "when" data may be defined in terms of an absolute value or a relative value. For example, an absolute value may be "every 20,000 miles" or "once per year" whereas a relative value may be "eighteen months from previous service" or some other value triggered by a detectable event. The maintenance data source 300 may also give further information about each maintenance task, for example one or more of what specific part of the entity requires maintenance, one or more components that are required for maintenance or replacement, how long the task is likely to take, the manpower required, machinery/tools required and any requirements of the maintenance facility, i.e. the berth or dock.

In the context of shipping, two or more of the organization data sources 321A, 322A, 323A may indicate the same type of entity, e.g. ship. By ingesting the maintenance data source 330 as a reference source, the ontology application 304 may populate, or at least provide a source of reference data, for enriching data objects stored in the resource database 116 based on their type; more specifically, it is possible to determine, for individual entities belonging to an organization, what maintenance tasks need to be performed and by when.

Another data source may be a facility data source 340. The facility data source 340 may provide datasets representing what maintenance facilities are available at different locations. Such datasets may comprise a location identifier, and data representing characteristics of said location, e.g. one or more of components available at said location, manpower available at said location, machinery/tools available at said location and any special features of said location, such as size of craft it can cater for. Said datasets may be more granular, e.g. for each location identifier there may be a plurality of different sub-identifiers corresponding to different bays or servicing points and each may have a respective set of characteristic data. For example, one servicing point of a location may cater for a larger or heavier craft than another servicing point of the same location. This "facility data" may be time-sensitive, i.e. some values of the characteristic data may be stored against a time index reflecting changes over time. The changes may be based on a schedule or based on allocations already made by a maintenance application, to be described later on. For example, available components may deplete in number based on allocations already scheduled, and may increase in number in correspondence to scheduled deliveries of components. The availability of a particular bay or servicing point may change over time also, for example based on said allocations already scheduled for a particular date and time period.

Plural maintenance data sources 330 and facility data sources 340 may be provided, and may derive from different other organizations, such as one or more entity manufacturers, port authorities, maintenance organizations or third party data aggregators. Datasets provided from the maintenance data sources 330 and facility data sources 340 are ingested by the ontology application 304 to ensure that datasets conform with the core ontology 302 and therefore can be processed without error and in a consistent way by downstream applications and systems, including a maintenance application 350. The ontology application 304 may also enrich organizational datasets to incorporate, for example, the maintenance data based on the entity type for each of the organizations.

Figure 4:
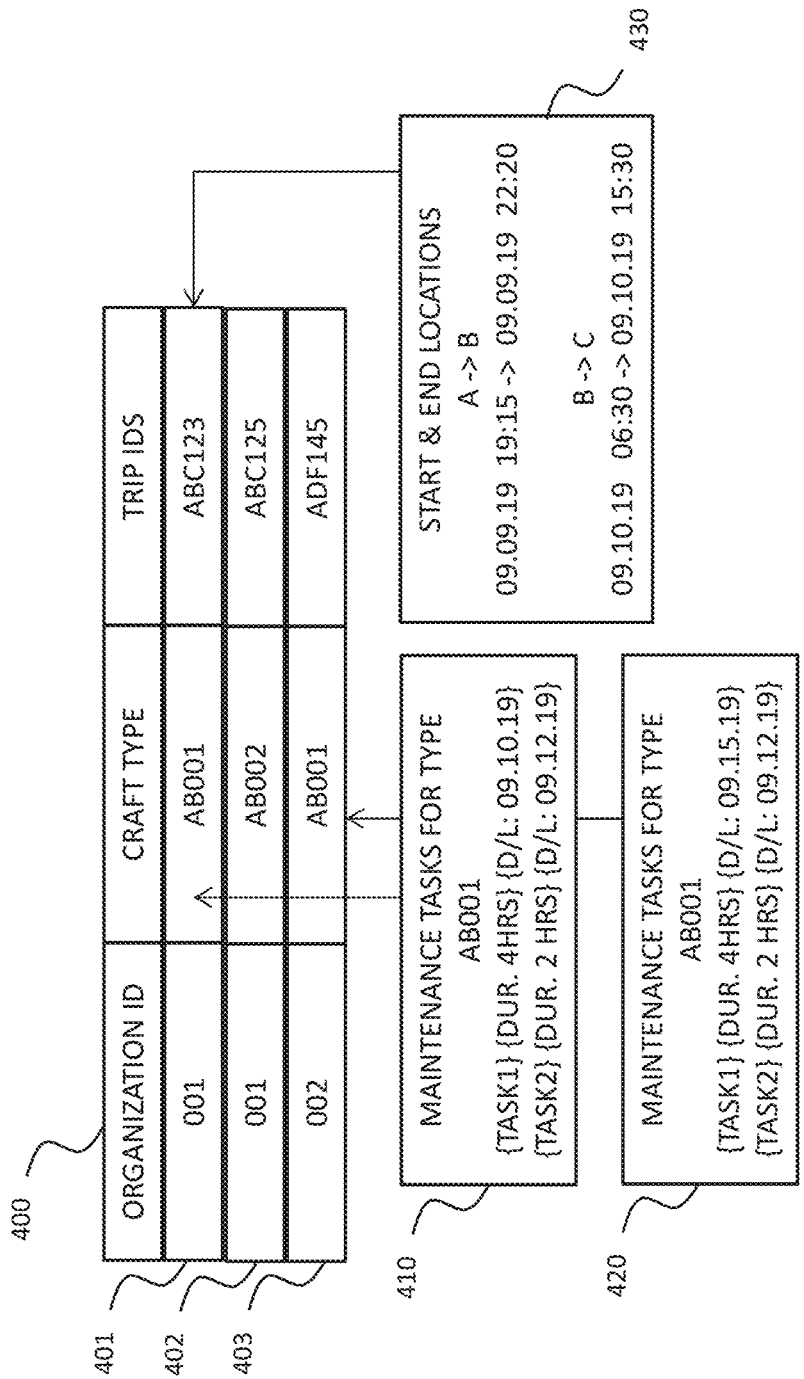
FIG. 4 is a schematic diagram illustrating how enrichment of datasets may be performed to create data objects in a database according to embodiments of this specification.

FIG. 4 is a representation view of how enrichment of received datasets from the organizations 321-323, may be performed. First and second datasets 401, 402 may comprise an organization identifier (organizational ID) associated with the first organization 321 and, associated therewith, a craft type and a trip identifier. A third dataset 403 may be associated with the second organization 322. The ontology application 304 ensures that the data item or value in each dataset conforms with the core ontology 302 before storing the relevant datasets as the appropriate data objects as represented in the table 400.

Based on the craft type data objects, the ontology application 304 may enrich the database, whether using links to, or by creating and populating new fields 410, using data corresponding to the craft type "AB001" from the maintenance data source 330. This may involve receiving maintenance data for this craft type and determining therefrom that two tasks are next due, i.e. task 1 and task 2. The maintenance data may also indicate the estimated duration of the respective tasks, and a value comprising a deadline for performing the respective tasks, or for calculating the value. The deadline may depend on the maintenance data, e.g. whether the deadline is calculated by adding an offset from a value reflecting a previous maintenance or other event, or as an absolute value, e.g. if there is a general requirement servicing for this type of craft. Similarly, the ontology application 304 may perform the same enrichment and calculation for the third dataset 403 associated with the different organization, to create and populate new fields 420. This may use the same maintenance data from the maintenance data source 330 for the same craft type, and this may or may not produce the same tasks, durations and deadlines. In the shown example, there is a different deadline for the first task, which may be due to the previous occurrence of the first task taking place a few days later than was the case for the other organization.

Similarly, the trip identifier may indicate one or more future trips that the particular craft is scheduled to take. The trip identifier may be resolved to a particular start and end location having an associated start and end time. It may also be resolved to a particular dock time or waiting time, based on a subsequent trip identifier, reflecting how long the particular craft will be at the dock so that maintenance can be performed. This enriched data is indicated by reference numeral 430.

If a plurality of trip identifiers is provided over an extended time span, it follows that allocation of one or more tasks to a particular time slot can be performed at a selected location in order to meet the deadline.

The maintenance application 350, which may be part of the ontology system 301 or part of another application module 360, is configured to ensure security of the stored data objects, or data objects derived therefrom, and to perform an allocation algorithm for maintenance planning.

Figure 5:
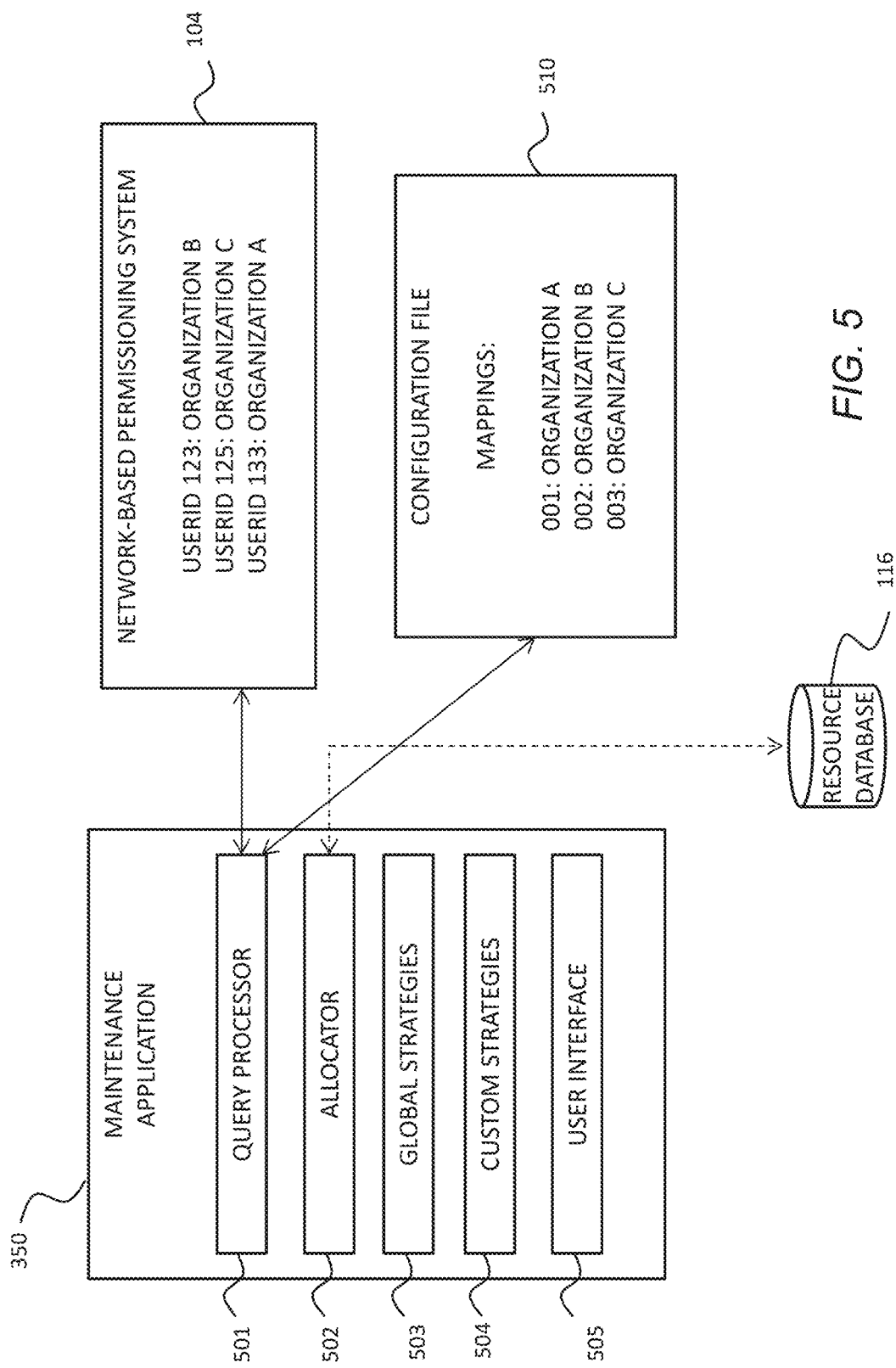
FIG. 5 is a schematic diagram of how the maintenance application of FIG. 3 may interact with a permissioning system and configuration file to handle interactions with a database according to embodiments of this specification.

FIG. 5 is a block diagram showing functional modules of the maintenance application 350. As mentioned, the maintenance application 350 may be common to all users of the various organizations 321-323 that store data objects in the resource database 116. The maintenance application 350 may therefore be a web application that is displayed at user terminals of organizational users via a web browser or the like. The maintenance application 350 may alternatively be a stand-alone application that is downloaded to organizational users for running respective instances on respective client terminals 310-312. However, the maintenance application 350 requires no specific tailoring to particular organizations 321-323. It is assumed that the particular organizations 321-323 are pre-registered with the resource database 116, which pre-registration may include setting up an organizational identifier (organizational ID) which is unique to the organization and identifying one or more users via user identifiers (UserIDs) associated with that organizational identifier. This may also involve setting up UserIDs and credentials for authenticating the users to the network-based permissioning system 104. Such credentials may comprise a password or some other means or systems for verifying that a user is authorized to access data objects in the resource database 116 associated with a particular pre-registered organization 321-323. As shown in FIG. 5, the network-based permissioning system 104 may store a mapping between User IDs and the organization to which they are registered.

The maintenance application 350 comprises a query processor 501, an allocator 502, one or more global strategies 503, one or more custom strategies 504 and a user interface 505. The maintenance application 350 may also comprise, or have access to, a configuration file 510.

The maintenance application 350 is associated with the resource database 116, and in particular to the shared portion of it which stores data objects for the different pre-registered organizations 321-323. Because the maintenance application 350 may be common to all users of the various organizations 321-323 that store data objects in the resource database 116, it can be web-based which avoids the client terminals 310-312 having to retrieve, store and run their own local versions. Even if local versions are provided, these will be substantially identical, and light-weight/thin applications. This means, however, that the data objects exposed to organizational users in the course of using the maintenance application 350 needs to be secure in the sense that data objects for other organizations should not be seen, even though they form part of the same resource database 116 or shared portion of it. This also avoids the need to create "silos" within the resource database 116, i.e. one for each organization, avoiding additional handling functionality at the DMS.

Mapping of users, or rather their queries, to a particular set of data objects is handled by the query processor 501. The query processor 501, upon receiving a query via the maintenance application 350, passes the query to the network-based permissioning system 104 which obtains (or otherwise requests if the query does not contain it) the UserID and any other credentials such as a password. Upon verification or authentication, the network-based permissioning system 104 may return to the query processor 501 a message that causes it to refer to the configuration file to obtain the organizational identifier for the querying user. This may be termed a mapping, and may be stored in the configuration file using any suitable mapping technique. For example, the mapping may reflect a particular sub-division of the organization which may be used to limit access to particular data objects associated with the sub-division.

Upon identifying the organizational identifier, the query processor 501 may then apply the received query, and all subsequent queries for a current session, only to data objects for the particular organization or sub-division. For example, referring also to FIGS. 3 and 4, if a user of terminal 310 queries the resource database 116 to view or edit a maintenance schedule for their organization, the query may be resolved to UserID=133, which maps to organization A, and this maps via the configuration file 510 to organization identifier=001. This means that only the first two datasets 401, 402 in FIG. 4 can be viewed, edited and/or propagated to a transformation or data flow in the current session. The third dataset 403 is otherwise invisible and cannot be seen by the relevant user.

Despite being invisible, the third dataset 403 may be viewed, edited and/or propagated by another user belonging to the associated organization. This may well affect the result of any transformation or dataflow of other users because it may result in an allocation of maintenance resources performed by the maintenance application 350.

The allocator 502 is configured to perform allocation of one or more future maintenance tasks based on the data objects in the resource database 116. This is by means of the allocator 502 running one or more maintenance planning algorithms to allocate one or more future maintenance tasks to so-called work packages to be performed at a future location and time, the allocating thus being based at least on the future locations and times of the relevant entity (e.g. craft) and a determined future availability at those locations and times.

A work package may be a set of one or more distinct tasks, e.g. servicing component A and replacing component B, into a data object for performance at a single location, e.g. at the same location or a particular facility at the location. A work package may comprise a plurality of tasks to be performed sequentially or simultaneously. Therefore, a work package, as well as having a distinct identifier, e.g. WP #17, may have a location property and a duration when allocated. So, a work package may comprise properties such as { WP #17; LISBON BERTH #5; task #1, task #2; 6 HOURS} reflecting that the work package is assigned to berth 5 of the location Lisbon and comprises two tasks that will take six hours to perform. Initially, the work package may be blank, i.e. comprise null values but may be populated with data by the allocator 502 when performing the allocation algorithm. By providing work packages, the maximum or an optimal number of tasks needing performance by a certain date and/or time can be grouped and performed at the same location dependent on, for example, the availability of that location and the facilities and/or other properties that are at that location.

For example, if it is known that a particular entity or craft needs one or more tasks performing, what those tasks involve, requirements for performance of those tasks and/or when the tasks need to be performed, then the maintenance planning algorithm, using knowledge of where the entity or craft is going to be in the future, how long for, and what capabilities and/or facilities are available at those future locations, can make a suggested allocation according to one or more strategies.

A strategy may be a predefined algorithm that meets a data-defined requirement to produce an auto-proposal. An auto-proposal is a computer-generated allocation of a work package to an available time slot based on locations that have availability and, in some embodiments, based on whether it meets other requirements, or a predetermined number of requirements, for performance of the one or more tasks of the work package needing allocation.

A global strategy 503 may be an algorithm that is applied to all data objects regardless of organization identity. A custom strategy 504 may be an algorithm that is applied only to data objects of a particular organization; the custom strategy may be defined by a user for the particular organization via the maintenance application 350 or it can comprise one of a number of templated strategies from which the user may select. Thus, as well as maintaining security of what data objects can be seen by particular users, the configuration file 510 is also used to open-up and apply custom strategies particular to the organization to which the user belongs.

For example, an example of a global strategy 503 may be termed "nearest neighbor". The nearest neighbor strategy allocates a work package based on minimizing the time between when the most urgent task of the work package is due and when it is performed. Another example of a global strategy 503 may be termed "nearest neighbor plus capacity" which takes into account nearest neighbor plus whether the particular location has a predetermined level of manpower capacity and/or time capacity to perform the tasks of the work package. The predetermined level may be defined in terms of a percentage and may be user configurable. For example, if the predetermined level of time capacity is 120% then this may allow allocation of a work package requiring eight hours to an available time slot of duration six hours and forty minutes. The aim here is to open-up more time slots when performing the conventional nearest neighbor search for availability. If an organization wishes to deviate from a default predetermined level, e.g. to select 100% capacity instead of 120%, then the global strategy may become a custom strategy for that organization.

For example, an example of a custom strategy 503 may be only to allocate work packages to time slots corresponding to daylight hours. Thus, time slots at locations corresponding to hours of darkness will not be suitable candidates if this custom strategy 503 is employed.

The performance of strategies may follow a workflow in a particular order. For example, a nearest neighbor strategy may first be employed; if deemed unsuitable, a nearest neighbor plus capacity may then be performed. As will be explained below, further user adjustment may comprise another part of the workflow.

The user interface 505 is configured to present a view, being a two, or possibly a three-dimensional image for output on a display terminal associated with a terminal 310-312 that entered a query or another terminal associated with the same organization.

The user interface 505 may for example generate a view giving an indication of one or more allocated work packages for the relevant organization relative to a timeline. The user interface 505 may be interactive, prompting user selection of one or more presented items and/or manipulation.

Figure 6:
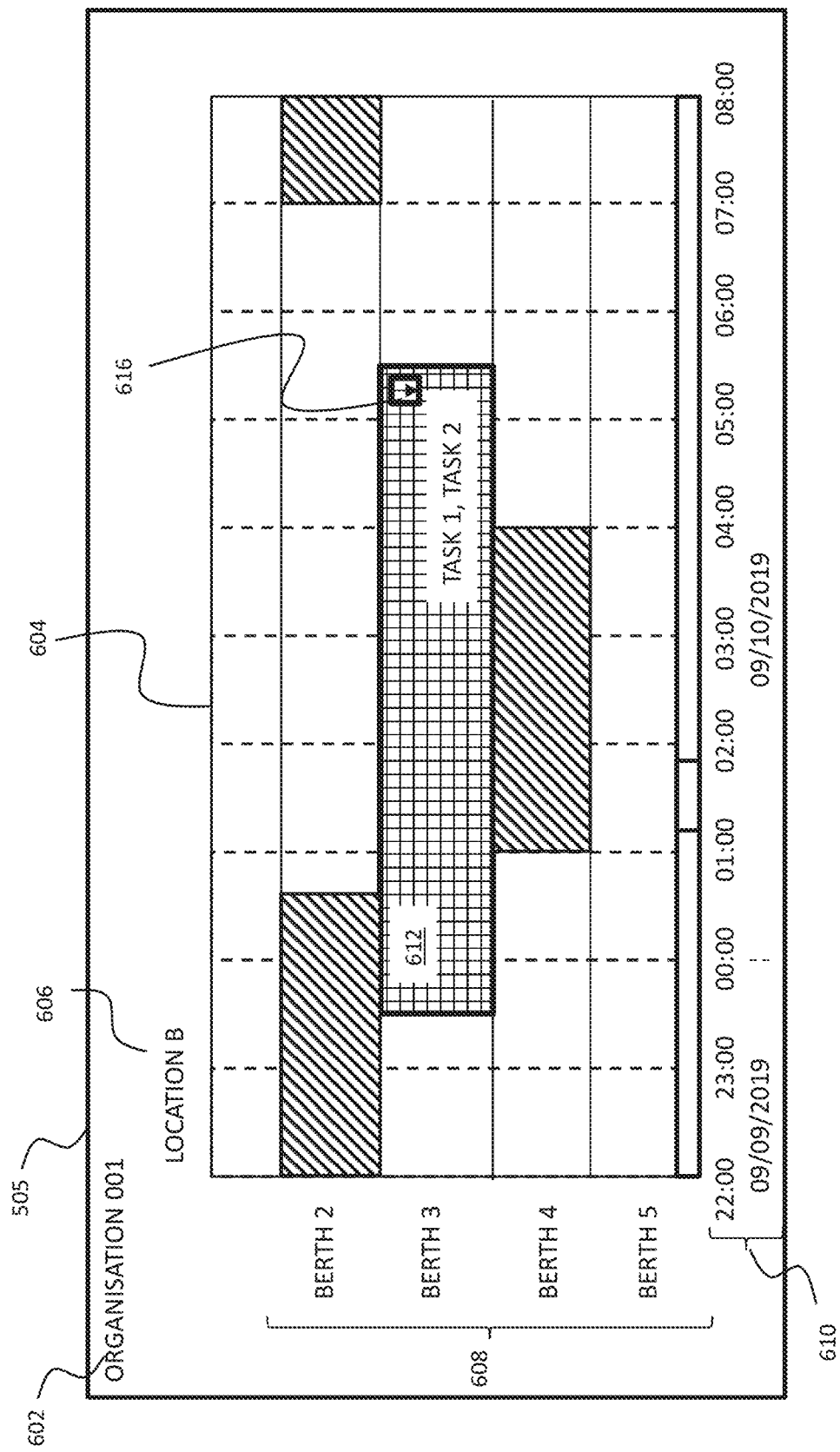
FIG. 6 is a representation of a user interface that may be generated by the maintenance application of FIG. 3 according to embodiments of this specification.

FIG. 6 shows an example user interface 505 comprising, for a particular organization 602, a grid 604 which represents different maintenance locations on a vertical axis relative to a timeline 610 on a horizontal axis. In this example, the maintenance location is indicated by an identifier 606 and comprises a plurality of sub-locations or "berths" 608. In an alternative embodiment, each sub-location may be replaced with distinct and geographically-remote locations, such as different ports, airports, maintenance depots and so on. The shaded regions on the grid 604 represent existing allocations of work packages for the particular organization; other allocations of work packages for other organizations are invisible but nevertheless are taken into account for determining availability. The hatched region 612 represents an auto-proposal generated in accordance with the above description. For example, the hatched region 612 may represent an auto proposal for allocating a work package comprising tasks 1 and 2 indicated in FIG. 4. These tasks require a total of six hours to complete and the maintenance application 350, using a nearest neighbor strategy, may allocate the work package containing these tasks to the shown time slot on the basis that (i) the relevant craft is at location B for greater than six hours, (ii) the relevant berth at location B is available for at least six hours and (iii) it is the nearest available time slot meeting conditions (i) and (ii) before the due date of Oct. 9, 2019.

An indicator 616 may be provided on, or associated with, the auto proposal 612. The indicator 616 may for example comprise a pull-down menu or other interactive screen element. The indicator 616 may serve to alert the user, for example that one or more aspects or conditions of the strategy may be violated, or there may be a risk of violation. For example, the indicator 616 may alert the user that the proposed berth is operating at 90% of its usual capacity which may require additional time to complete the tasks in the work package. For example, the indicator 616 may alert the user that there is a risk that an allocation to the same berth, immediately before the proposed allocation, may overrun. The indicator 616, when selected, may present a number of options to the user. For example, one option may be to accept the auto proposal. Selection may result in a committed allocation. Another option is to enable the user to select an alternative allocation. This may result in another auto proposal being performed using, for example, the nearest neighbor plus capacity strategy. This may produce a new auto proposal at a different berth, a different location and/or at a different time slot. In some embodiments, the user may manually select an alternative available time slot using a drag and drop interaction. Only time slots that are available may be displayed in this instance, whilst not revealing the identity of other organizations nor the specific tasks.

In some embodiments, the specific tasks in the work package may be displayed on the user interface 505, for example within the hatched region 612, or may appear when a cursor hovers over the hatched region or when a user clicks over the hatched region. Other information may also be presented.

In some embodiments, the user may toggle between alternative views of work package allocations. For example, the user may wish to see a different user interface view of all work packages allocated to a particular entity or all available time slots for a particular location or set of locations.

In some embodiments, accepting a particular time slot allocation may reserve that time slot in the resource database 116, meaning that is no longer available to other allocations, unless released.

In some embodiments, accepting a particular time slot may be effective to cause transmission or sending of data for performing the one or more allocated maintenance tasks to a computerized resource associated with the allocated location and at, or prior to, the allocated time. For example, the sent data may comprise an instructional datasheet or manual to be transmitted to a computer associated with the allocated location, the datasheet or manual being a set of instructions for performing the one or more tasks of the work package. In some embodiments, the sent data may comprise machine-readable configuration data for setting a computerized machine, diagnostic facility or other equipment to perform at least part of the one or more tasks of the work package. In some embodiments, the sent data may comprise one or more other forms of machine readable data, specific to the one or more tasks of the work package.

Figure 7:
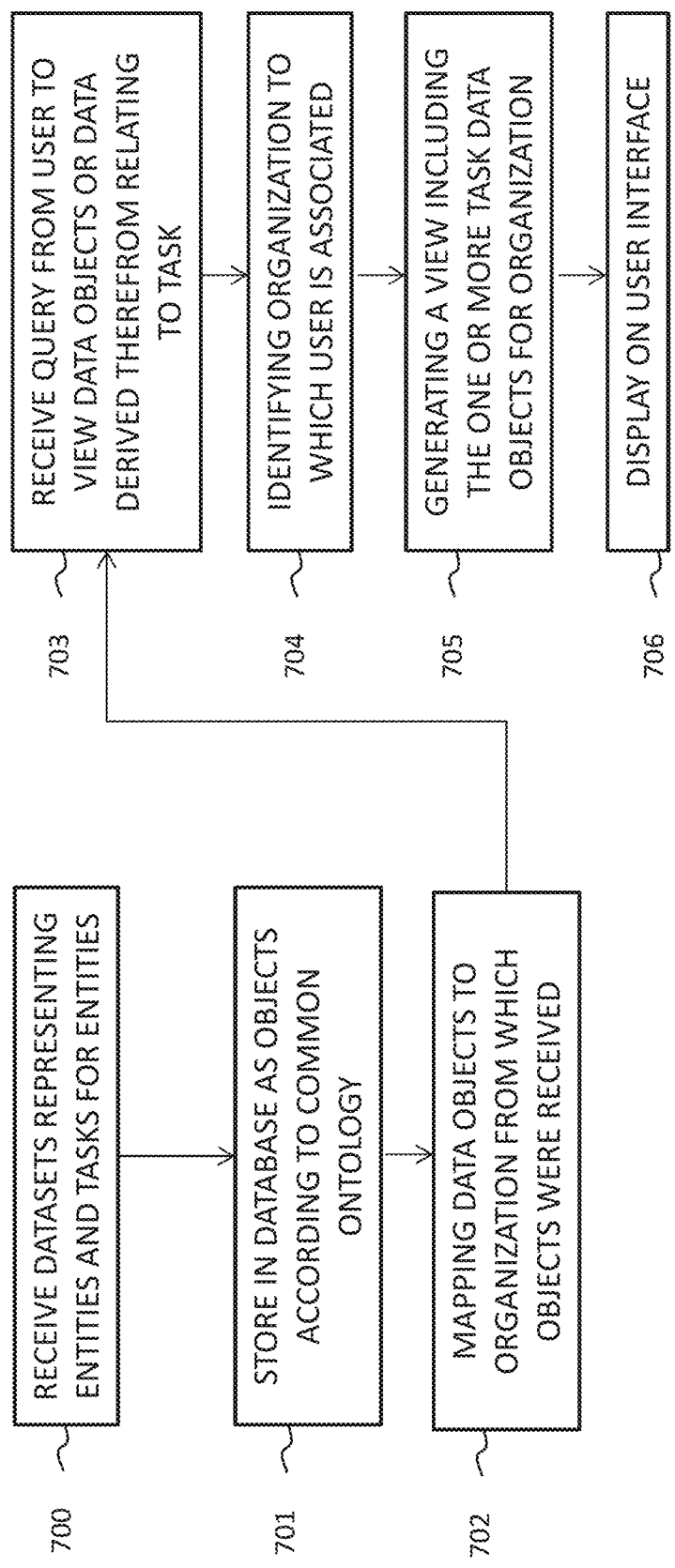
FIG. 7 is a flow diagram showing other processing operations according to embodiments of this specification.

FIG. 7 is a flow diagram showing operational steps that may be performed by one or more processors in accordance with example embodiments. The order of operations is not necessarily indicative of the order of processing. Additional and/or equivalent operations may be used.

A first operation 700 may comprise receiving datasets representing entities and maintenance tasks for the entities.

A second operation 701 may comprise storing in a database the received datasets as objects in accordance with a common ontology.

A third operation 702 may comprise mapping the data objects to an organization from which the data objects stored were received.

A fourth operation 703 may comprise receiving a query from a user to view data objects or data derived therefrom relating to a maintenance task.

A fifth operation 704 may comprise identifying the organization to which the user is associated.

A sixth operation 705 may comprise generating a view including the one or more maintenance data objects for the organization.

A seventh operation 706 may comprise displaying the view on a user interface.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, performed by one or more processors, comprising:
   constructing an ontology, wherein the ontology defines constraints over properties of data objects and relationships between the data objects;
   receiving, from the one or more predetermined organizations, datasets representing entities and datasets representing one or more tasks for those entities;
   selectively storing in a database, in accordance with the ontology, the received one or more datasets as data objects, wherein the data objects comply with the constraints defined by the ontology, and the selectively storing comprises:
      detecting a data object in a data field from one of the dataset is in a non-compliant format that fails to meet at least one of the constraints imposed by the ontology;
      in response to detecting the data object is in a non-compliant format, automatically converting the data object to a compliant format that meets the constraints imposed by the ontology;
      displaying, through a user interface, an alert indicating the conversion of the data to the compliant format and a prompt; and
      in response to the prompt being selected, automatically converting subsequent data objects in the data field from the dataset to the compliant format;
   mapping the data objects stored in the database to the organization from which the one or more datasets were received;
   receiving, through a querying application, a query from a user of one of the predetermined organizations to view one or more data objects relating to a task;
   identifying the organization to which the user is associated;
   generating, based on the mapping, a view including at least the one or more data objects associated with the identified organization; and
   displaying the view on a user interface.

2. The method of claim 1, wherein the ontology is defined according to a schema data definition language (DDL).

3. The method of claim 1, wherein the automatically converting of the subsequent data objects is without displaying the alert or the prompt.

4. The method of claim 1, wherein the querying application is a web-based application.

5. The method of claim 1, wherein the stored data objects include one or more identifiers unique to the organization from which the one or more datasets were received and wherein the mapping between the organizations and their one or more unique identifiers is provided in a configuration file.

6. The method of claim 1, wherein the querying application identifies the organization to which the user is associated by means of accessing an external permissioning system, which external permissioning system stores a mapping between a user identifier associated with the user query and the organization to which the user belongs.

7. The method of claim 6, wherein the querying application further identifies, from the external permissioning system, database actions that the identified user is permitted to perform on data objects in the generated view, the querying application further enforcing said actions.

8. The method of claim 1, wherein the received datasets represent data objects including:
one or more mobile entities;
for each mobile entity:
one or more tasks; and
one or more future locations of the mobile entity at respective times;
the method further comprising, for a particular mobile entity, performing a planning algorithm to allocate the one or more future tasks to a work package to be performed at a future location and time, the allocating being based at least on the future locations and times of the mobile entity and a determined future availability at those locations and times, the generated view of the one or more stored data objects including an indication of the allocated work package and not allocations of work packages for other organizations.

9. The method of claim 8, wherein a plurality of available predetermined work packages are predefined as belonging to a particular maintenance resource at a particular location, and wherein allocation of one or more future tasks for a mobile entity to a said work package prevents said work package being made available to other organizations.

10. The method of claim 8, wherein the allocating comprises applying one or more predefined allocation strategies based at least on an estimated time to perform the one or more future tasks.

11. The method of claim 8, wherein the generated view comprises an indication of one or more allocated work packages for that particular organization relative to a timeline.

12. The method of claim 8, wherein the one or more allocated work packages are user-modifiable through the user interface to an alternative location and/or time available to that particular organization.

13. The method of claim 8, further comprising sending data for performing the one or more allocated tasks to a computerized resource associated with the location and at, or prior to, the allocated time.

14. The method of claim 1, wherein received datasets represent one or more maintenance tasks for entities.

15. The method of claim 1, further comprising:
propagating the one or more constraints of the ontology to one or more downstream transforms and other ontologies.

16. The method of claim 1, further comprising:
generating or deriving a second ontology based on the data objects that conform to the ontology.

17. The method of claim 1, further comprising:
in response to receiving the query, retrieving a policy object associated with the one or more data objects, wherein the policy object includes a data structure that indicates an identifier of the one or more data objects, one or more identifiers of one or more parent data resources from which the one or more data objects depend, and one or more identifiers of dependent resources of the one or more data objects; and
the generating of the view is based on the policy object.

18. A computer program, stored on a non-transitory computer readable medium, which, when executed by one or more processors of a data processing apparatus cause the data processing apparatus to perform operations comprising:
constructing an ontology, wherein the ontology defines constraints over properties of data objects and relationships between the data objects;
receiving, from one or more organizations, datasets representing entities and datasets representing one or more tasks for those entities;
selectively storing in a database, in accordance with the ontology, the received one or more datasets as data objects, wherein the data objects comply with the constraints defined by the ontology, and the selectively storing comprises:
detecting a data object in a data field from one of the dataset is in a non-compliant format that fails to meet at least one of the constraints imposed by the ontology;
in response to detecting the data object is in a non-compliant format, automatically converting the data object to a compliant format that meets the constraints imposed by the ontology;
displaying, through a user interface, an alert indicating the conversion of the data to the compliant format and a prompt; and
in response to the prompt being selected, automatically converting subsequent data objects in the data field from the dataset to the compliant format;
mapping the data objects stored in the database to the organization from which the one or more datasets were received;
receiving, through a querying application, a query from a user of one of the one or more organizations to view one or more data objects relating to a task;
identifying the organization to which the user is associated;
generating, based on the mapping, a view including at least the one or more data objects associated with the identified organization; and
displaying the view on a user interface.

19. An apparatus comprising one or more processors and a non-transitory memory, wherein the non-transitory memory stores instructions that, when executed, instruct the one or more processors to perform operations comprising:
constructing an ontology, wherein the ontology defines constraints over properties of data objects and relationships between the data objects;
receiving, from one or more organizations, datasets representing entities and datasets representing one or more tasks for those entities;
selectively storing in a database, in accordance with the ontology, the received one or more datasets as data objects, wherein the data objects comply with the constraints defined by the ontology, and the selectively storing comprises:
detecting a data object in a data field from one of the dataset is in a non-compliant format that fails to meet at least one of the constraints imposed by the ontology;
in response to detecting the data object is in a non-compliant format, automatically converting the data object to a compliant format that meets the constraints imposed by the ontology;
displaying, through a user interface, an alert indicating the conversion of the data to the compliant format and a prompt; and
in response to the prompt being selected, automatically converting subsequent data objects in the data field from the dataset to the compliant format;

mapping the data objects stored in the database to the organization from which the one or more datasets were received;

receiving, through a querying application, a query from a user of one of the one or more organizations to view one or more data objects relating to a task;

identifying the organization to which the user is associated;

generating, based on the mapping, a view including at least the one or more data objects associated with the identified organization; and displaying the view on a user interface.

20. The apparatus of claim 19, wherein the stored data objects include one or more identifiers unique to the organization from which the one or more datasets were received and wherein the mapping between the organizations and their one or more unique identifiers is provided in a configuration file.

* * * * *